United States Patent
Lei et al.

(10) Patent No.: US 11,219,048 B2
(45) Date of Patent: Jan. 4, 2022

(54) SCHEDULING TRANSMISSION OF DATA

(71) Applicant: Motorola Mobility LLC, Chicago, IL (US)

(72) Inventors: Haipeng Lei, Beijing (CN); Zhi Yan, Beijing (CN); Lianhai Wu, Beijing (CN); Xiaodong Yu, Beijing (CN)

(73) Assignee: Motorola Mobility LLC, Chicago, IL (US)

( * ) Notice: Subject to any disclaimer, the term of this patent is extended or adjusted under 35 U.S.C. 154(b) by 48 days.

(21) Appl. No.: 16/608,701

(22) PCT Filed: May 5, 2017

(86) PCT No.: PCT/CN2017/083212
§ 371 (c)(1),
(2) Date: Oct. 25, 2019

(87) PCT Pub. No.: WO2018/201445
PCT Pub. Date: Nov. 8, 2018

(65) Prior Publication Data
US 2020/0196335 A1 Jun. 18, 2020

(51) Int. Cl.
*H04W 72/12* (2009.01)
*H04L 1/16* (2006.01)
(Continued)

(52) U.S. Cl.
CPC ....... *H04W 72/1273* (2013.01); *H04L 1/1614* (2013.01); *H04L 1/1816* (2013.01); *H04L 5/0055* (2013.01)

(58) Field of Classification Search
None
See application file for complete search history.

(56) References Cited

U.S. PATENT DOCUMENTS 10,721,046 B2 * 7/2020 Yang .................. H04W 76/27
10,784,987 B2 * 9/2020 Marinier ............. H04L 1/1896
(Continued)

FOREIGN PATENT DOCUMENTS

| CN | 101615986 A | 12/2009 |
| CN | 102318254 A | 1/2012 |
| CN | 104137460 A | 11/2014 |

OTHER PUBLICATIONS

PCT/CN2017/083212, Notification of Transmittal of the International Search Report and the Written Opinion of the International Searching Authority, or the Declaration, dated Jan. 26, 2018, pp. 1-11.

(Continued)

*Primary Examiner* — Tri H Phan
(74) *Attorney, Agent, or Firm* — Kunzler Bean & Adamson (57) ABSTRACT

Apparatuses, methods, and systems are disclosed for scheduling transmission of data. One apparatus (200) includes a receiver (212) that receives (402) a first signal from a base unit for scheduling a transmission of first data. The first data includes first multiple code blocks and each code block of the first multiple code blocks is independently decodable. The apparatus (200) includes a transmitter (210) that transmits (404) the first data. The receiver (212) receives (406) a second signal from the base unit for scheduling a transmission of second data, the second data includes second multiple code block groups of the first data, each code block group of the second multiple code block groups includes third multiple code blocks, and the transmitter (210) transmits (408) the second data.

20 Claims, 5 Drawing Sheets

(51) Int. Cl.
*H04L 1/18* (2006.01)
*H04L 5/00* (2006.01)

(56) References Cited

U.S. PATENT DOCUMENTS

| | | | | |
|---|---|---|---|---|
| 10,892,860 | B2* | 1/2021 | Wang | H04L 5/0082 |
| 2011/0080975 | A1 | 4/2011 | Toda et al. | |
| 2019/0207734 | A1* | 7/2019 | Yang | H04L 1/1819 |
| 2019/0386782 | A1* | 12/2019 | Yang | H04L 1/1819 |
| 2020/0154309 | A1* | 5/2020 | Takeda | H04L 1/1614 |
| 2021/0258127 | A1* | 8/2021 | Yang | H04L 5/0055 |

OTHER PUBLICATIONS

Huawei, Hisilicon, "Discussion on CBG-based feedback and retransmission", 3GPP TSG RAN WG1 Meeting #88bis R1-1705066, Apr. 3-7, 2017, pp. 1-4.

Qualcomm Incorporated, "Multi-bit HARQ-ACK feedback HARQ design principle", 3GPP TSG RAN WG1 #88bis R1-1705618, Apr. 3-7, 2017, pp. 1-4.

3GPP, "3rd Generation Partnership Project; Technical Specification Group Radio Access Network; Evolved Universal Terrestrial Radio Access (E-UTRA); Multiplexing and channel coding (Release 14)", 3GPP TS 36.212 V14.2.0, Mar. 2017, pp. 1-197.

Ericsson, "On Protocol Impacts of Code Block Group Based HARQ-ACK Feedback", 3GPP TSG-RAN WG1 Meeting #88bis R1-1706049, Apr. 3-7, 2017, pp. 1-3.

Samsung, "Overview of CBG-based retransmission in NR", 3GPP TSG RAN WG1 Meeting #88bis R1-1705401, Apr. 3-7, 2017, pp. 1-4.

* cited by examiner

SCHEDULING TRANSMISSION OF DATA

FIELD

The subject matter disclosed herein relates generally to wireless communications and more particularly relates to scheduling transmission of data.

BACKGROUND

The following abbreviations are herewith defined, at least some of which are referred to within the following description: Third Generation Partnership Project ("3GPP"), Positive-Acknowledgment ("ACK"), Binary Phase Shift Keying ("BPSK"), Clear Channel Assessment ("CCA"), Cyclic Prefix ("CP"), Cyclical Redundancy Check ("CRC"), Channel State Information ("CSI"), Common Search Space ("CSS"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Guard Period ("GP"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Long Term Evolution ("LTE"), Multiple Access ("MA"), Modulation Coding Scheme ("MCS"), Machine Type Communication ("MTC"), Multiple Input Multiple Output ("MIMO"), Multi User Shared Access ("MUSA"), Narrowband ("NB"), Negative-Acknowledgment ("NACK") or ("NAK"), Next Generation Node B ("gNB"), Non-Orthogonal Multiple Access ("NOMA"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Random Access Response ("RAR"), Radio Network Temporary Identifier ("RNTI"), Reference Signal ("RS"), Resource Spread Multiple Access ("RSMA"), Round Trip Time ("RTT"), Receive ("RX"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Transport Block ("TB"), Transport Block Size ("TBS"), Time-Division Duplex ("TDD"), Time Division Multiplexing ("TDM"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NACK"). ACK means that a TB is correctly received while NACK (or NAK) means a TB is erroneously received.

In certain wireless communications networks, feedback may be provided via a HARQ-ACK to indicate whether or not data was received correctly. In some configurations, HARQ-ACK resources may take up unnecessary space and/or waste resources. In certain configurations HARQ-ACK feedback may be inefficient.

BRIEF SUMMARY

Apparatuses for scheduling transmission of data are disclosed. Methods and systems also perform the functions of the apparatus. In one embodiment, the apparatus includes a receiver that receives a first signal from a base unit for scheduling a transmission of first data. In various embodiments, the first data includes first multiple code blocks and each code block of the first multiple code blocks is independently decodable. In certain embodiments, the apparatus includes a transmitter that transmits the first data. In some embodiments, the receiver receives a second signal from the base unit for scheduling a transmission of second data, the second data includes second multiple code block groups of the first data, each code block group of the second multiple code block groups includes third multiple code blocks, and the transmitter transmits the second data.

In one embodiment, the first signal is used for scheduling an initial transmission and the second signal is used for scheduling a retransmission. In a further embodiment, the first signal and the second signal have a same payload size. In certain embodiments, the second signal further includes a bitmap and each bit in the bitmap indicates a decoding result corresponding to a code block group of the first data. In various embodiments, the decoding result corresponding to a code block group is an ACKNOWLEDGEMENT in response to all the code blocks of the code block group being correctly decoded and a NEGATIVE ACKNOWLEDGEMENT in response to not all the code blocks of the code block group being correctly decoded. In some embodiments, a length of the bitmap is configured by the base unit. In one embodiment, a length of the bitmap is predefined.

In certain embodiments, a length of the bitmap is equal to a configured maximum number of code block groups. In some embodiments, the bitmap is determined by reinterpreting a field in the second signal for indicating modulation and coding scheme, transmit power adjustment, frequency resource allocation, or some combination thereof. In various embodiments, the bitmap in the first signal is reinterpreted as a number of code block groups the first data is partitioned into.

In one embodiment, the second signal further includes a field for indicating a code block group of the first data in response to the code block group not being correctly decoded and to be transmitted in the second data. In certain embodiments, the field includes an index to the code block group to be transmitted. In some embodiments, the field includes an index to one of multiple predefined patterns for indicating one or more code block groups to be transmitted. In various embodiments, the field in the first signal is reinterpreted as a number of code block groups the first data is partitioned into.

In some embodiments, a field for indicating modulation and coding scheme in the second signal is split into two parts with one part for indicating modulation and another part for indicating a code block group to be retransmitted. In certain embodiments, the second signal includes a field that indicates feedback information corresponding to the first data, a number of code block groups is equal to a bit length of the field, and a code block group size is changed based on a number of code blocks remaining to be retransmitted in the second data. In various embodiments, the second signal includes a field that indicates feedback information corresponding to the first data, a number of code block groups is equal to a bit length of the field, and a code block group size is unchanged regardless of a number of code blocks remaining to be retransmitted in the second data.

A method for scheduling transmission of data, in one embodiment, includes receiving a first signal from a base unit for scheduling a transmission of first data. In various embodiments, the first data includes first multiple code blocks and each code block of the first multiple code blocks is independently decodable. In certain embodiments, the method includes transmitting the first data. In various embodiments, the method includes receiving a second signal from the base unit for scheduling a transmission of second data. In some embodiments, the second data includes second multiple code block groups of the first data, and each code block group of the second multiple code block groups include third multiple code blocks. In some embodiments, the method includes transmitting the second data.

In one embodiment, an apparatus for scheduling transmission of data includes a transmitter that transmits a first signal to a remote unit for scheduling a transmission of first data. In various embodiments, the first data includes first multiple code blocks and each code block of the first multiple code blocks is independently decodable. In certain embodiments, the apparatus includes a receiver that receives the first data. In some embodiments, the transmitter transmits a second signal to the remote unit for scheduling a transmission of second data, the second data includes second multiple code block groups of the first data, each code block group of the second multiple code block groups includes third multiple code blocks, and the receiver receives the second data.

In one embodiment, the first signal is used for scheduling an initial transmission and the second signal is used for scheduling a retransmission. In a further embodiment, the first signal and the second signal have a same payload size. In certain embodiments, the second signal further includes a bitmap and each bit in the bitmap indicates a decoding result corresponding to a code block group of the first data. In various embodiments, the decoding result corresponding to a code block group is an ACKNOWLEDGEMENT in response to all the code blocks of the code block group being correctly decoded and a NEGATIVE ACKNOWLEDGEMENT in response to not all the code blocks of the code block group being correctly decoded. In some embodiments, a length of the bitmap is configured by the base unit. In one embodiment, a length of the bitmap is predefined.

In certain embodiments, a length of the bitmap is equal to a configured maximum number of code block groups. In some embodiments, the bitmap is determined by reinterpreting a field in the second signal for indicating modulation and coding scheme, transmit power adjustment, frequency resource allocation, or some combination thereof. In various embodiments, the bitmap in the first signal is reinterpreted as a number of code block groups the first data is partitioned into.

In one embodiment, the second signal further includes a field for indicating a code block group of the first data in response to the code block group not being correctly decoded and to be transmitted in the second data. In certain embodiments, the field includes an index to the code block group to be transmitted. In some embodiments, the field includes an index to one of multiple predefined patterns for indicating one or more code block groups to be transmitted. In various embodiments, the field in the first signal is reinterpreted as a number of code block groups the first data is partitioned into.

In some embodiments, a field for indicating modulation and coding scheme in the second signal is split into two parts with one part for indicating modulation and another part for indicating a code block group to be retransmitted. In certain embodiments, the second signal includes a field that indicates feedback information corresponding to the first data, a number of code block groups is equal to a bit length of the field, and a code block group size is changed based on a number of code blocks remaining to be retransmitted in the second data. In various embodiments, the second signal includes a field that indicates feedback information corresponding to the first data, a number of code block groups is equal to a bit length of the field, and a code block group size is unchanged regardless of a number of code blocks remaining to be retransmitted in the second data.

A method for scheduling transmission of data, in one embodiment, includes transmitting a first signal to a remote unit for scheduling a transmission of first data. In various embodiments, the first data includes first multiple code blocks and each code block of the first multiple code blocks is independently decodable. In certain embodiments, the method includes receiving the first data. In various embodiments, the method includes transmitting a second signal to the remote unit for scheduling a transmission of second data. In some embodiments, the second data includes second multiple code block groups of the first data, and each code block group of the second multiple code block groups include third multiple code blocks. In some embodiments, the method includes receiving the second data.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
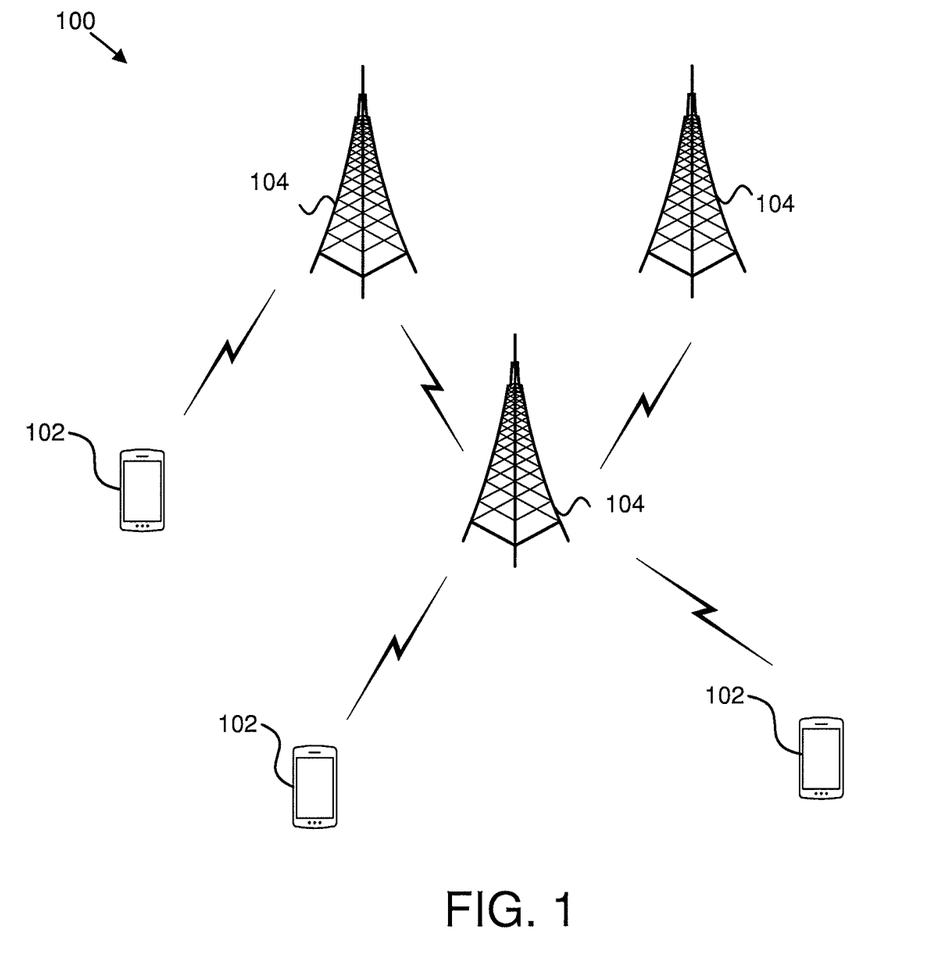
FIG. 1 is a schematic block diagram illustrating one embodiment of a wireless communication system for scheduling transmission of data.

FIG. 1 depicts an embodiment of a wireless communication system 100 for scheduling transmission of data. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 3GPP protocol, wherein the base unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, a remote unit 102 may receive a first signal from a base unit 104 for scheduling a transmission of first data. In various embodiments, the first data includes first multiple code blocks and each code block of the first multiple code blocks is independently decodable. In certain embodiments, the remote unit 102 may transmit the first data. In various embodiments, the remote unit 102 may receive a second signal from the base unit 104 for scheduling a transmission of second data. In some embodiments, the second data includes second multiple code block groups of the first data, and each code block group of the second multiple code block groups include third multiple code blocks. In some embodiments, the remote unit 102 may transmit the second data. Accordingly, a remote unit 102 may be used for receiving a signal for scheduling transmission of data. As used herein, "independently decodable" may mean that certain data may be decoded without having to decode data in additional to the certain data. For example, one code block may be decoded without having to decode any other code blocks.

In certain embodiments, a base unit 104 may transmit a first signal to a remote unit 102 for scheduling a transmission of first data. In various embodiments, the first data includes first multiple code blocks and each code block of the first multiple code blocks is independently decodable. In certain embodiments, the base unit 104 may receive the first data. In various embodiments, the base unit 104 may transmit a second signal to the remote unit 102 for scheduling a transmission of second data. In some embodiments, the second data includes second multiple code block groups of the first data, and each code block group of the second multiple code block groups include third multiple code blocks. In some embodiments, the base unit may transmit the second data. Accordingly, a base unit 104 may be used for transmitting a signal for scheduling transmission of data.

Figure 2:
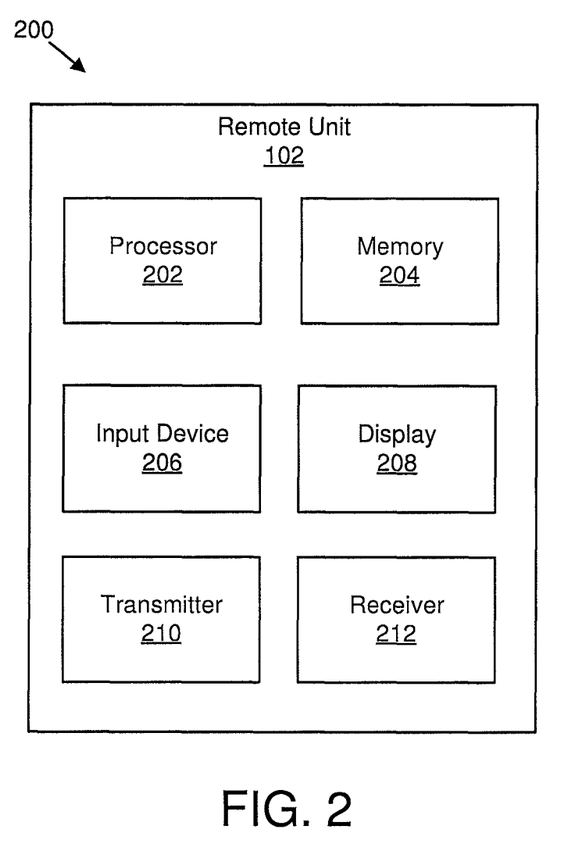
FIG. 2 is a schematic block diagram illustrating one embodiment of an apparatus that may be used for receiving a signal for scheduling transmission of data.

FIG. 2 depicts one embodiment of an apparatus 200 that may be used for receiving a signal for scheduling transmission of data. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to transmission of data. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In certain embodiments, the receiver 212 may be used to receive a first signal from a base unit 104 for scheduling a transmission of first data. In various embodiments, the first data includes first multiple code blocks and each code block of the first multiple code blocks is independently decodable. In certain embodiments, the transmitter 210 may be used to transmit the first data. In some embodiments, the receiver 212 may be used to receive a second signal from the base unit for scheduling a transmission of second data, the second data includes second multiple code block groups of the first data, each code block group of the second multiple code block groups includes multiple code blocks, and the transmitter 210 may be used to transmit the second data. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
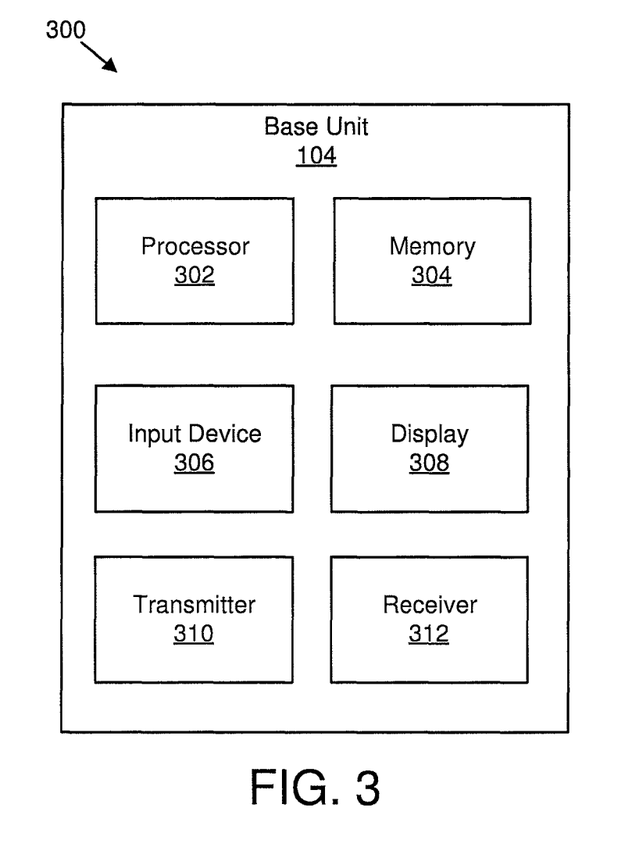
FIG. 3 is a schematic block diagram illustrating one embodiment of an apparatus that may be used for transmitting a signal for scheduling transmission of data.

FIG. 3 depicts one embodiment of an apparatus 300 that may be used for transmitting a signal for scheduling transmission of data. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the transmitter 310 may be used to transmit a first signal to a remote unit 102 for scheduling a transmission of first data. In various embodiments, the first data includes first multiple code blocks and each code block of the first multiple code blocks is independently decodable. In certain embodiments, the receiver 312 may be used to receive the first data. In some embodiments, the transmitter 310 may be used to transmit a second signal to the remote unit for scheduling a transmission of second data, the second data includes second multiple code block groups of the first data, each code block group of the second multiple code block groups includes third multiple code blocks, and the receiver 312 may be used to receive the second data. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In some embodiments, there are various options for HARQ-ACK transmission for UL data transmission to facilitate multi-bit HARQ-ACK feedback for UL code block group ("CBG") based retransmission that enables a same length of UL grants scheduling initial transmission and retransmission of a TB.

In one embodiment, a new field for CBG-based HARQ-ACK feedback indication in UL grants may be used for indicating decoding status of CBGs of one UL TB for scheduling initial transmission and retransmission. In some embodiments, a bit length of the new field may be semi-statically configured by a base unit 104, such as via RRC signaling.

In certain embodiments, RRC signaling may be used to enable single bit or multi-bit HARQ-ACK feedback for UL data transmission and CBG-based retransmission in embodiments in which multi-bit HARQ-ACK feedback is enabled. In another embodiment, RRC signaling for enabling multi-bit HARQ-ACK feedback for UL may also be used to semi-statically configure a maximum number of CBGs of an UL TB. In some embodiments, the maximum number of CBGs may be used to determine a length of a bit field for HARQ-ACK feedback corresponding to UL PUSCH transmission. In various embodiments, a value of the maximum number of CBGs may be set with consideration of signaling overhead for HARQ-ACK feedback indication and the retransmission efficiency as well as retransmission granularity. In certain embodiments, after a maximum number of CBGs is configured by a base unit 104, a remote unit 102 may know a bit length of an ACK/NACK field for single HARQ-ACK bit indication per CBG and at most how many CBGs one UL TB may be partitioned.

In some embodiments, after a bit length of a new field for CBG-based HARQ-ACK indication is configured by a base unit 104, a remote unit 102 may know at most how many CBGs one UL TB may be partitioned and a number of actual CBGs may be dynamically indicated by reinterpreting a field for CBG-based HARQ-ACK indication as the number of CBGs in UL grant for scheduling initial transmission. In certain embodiments, this may be because the field for CBG-based HARQ-ACK indication may be useless in UL grant for scheduling initial transmission of an UL TB. Accordingly, in various embodiments, in response to the number of code blocks ("CBs") of a TB is smaller than a semi-statically configured CBGs, an actually CBG number may be dynamically indicated by a base unit 104 to a proper value or a value equal to a number of CBs. In another embodiment, with a configured bit length, a remote unit 102 may know how many CBGs the UL TB is partitioned (e.g., a bit length may be equal to a number of CBGs). In such embodiments, the CBG size may be variable dependent on a number of CBs of one TB. In some embodiments, to facilitate a same payload size for DCI of UL grant scheduling initial UL transmission and retransmission, each UL grant may include the ACK/NACK field with same length.

In certain embodiments, for an UL grant scheduling an initial transmission of a TB, a field for CBG-based HARQ-ACK indication may be reserved. In various embodiments, for UL grants scheduling initial transmission a field for CBG-based HARQ-ACK indication may be set to a predefined state for virtual cyclic redundancy check ("CRC"). In some embodiments, for UL grant scheduling retransmission of a TB, an ACK/NACK field may be a bitmap with each bit indicating a decoding status corresponding to one CBG. In certain embodiments in which a number of CBGs is smaller than a configured maximum number of CBGs, some bits in the ACK/NACK field may be reserved. In various embodiments, a predefined rule may be used to link an order of bits with an order of CBGs. In one embodiment, a MSB of an ACK/NACK field indicates a HARQ-ACK corresponding to a first CBG. In another embodiment, a LSB of an ACK/NACK field indicates a HARQ-ACK corresponding to a first CBG. In certain embodiments, a LSB of an ACK/NACK field indicates a HARQ-ACK corresponding to a last CBG.

In some embodiments, for an UL grant scheduling a first retransmission and subsequent retransmissions, a number of bits in an ACK/NACK field may be larger than a number of CBGs in the retransmission, there may be a predefined rule used to link an order of bits with an order of CBGs. In various embodiments, one-bit new data indicator ("NDI") may be used to differentiate an initial transmission or retransmission of an UL TB. In certain embodiments, both a base unit 104 and a remote unit 102 may both have a same understanding of an NDI.

In some embodiments, there may be no need to include HARQ-ACK bits in an UL grant scheduling an initial transmission of one TB. Accordingly, some fields in an UL grant scheduling retransmission of the TB may be reused as CBG-based HARQ-ACK indication so as to keep a same payload size between the two UL grants (e.g., UL grant for scheduling initial transmission and UL grant for scheduling retransmission). In various embodiments, a number of CBGs may be determined by a bit length of the field reused as a CBG-based HARQ-ACK indication.

In certain embodiments, a one-bit NDI may be used to differentiate an initial transmission or retransmission of an UL TB. In some embodiments, both a base unit 104 and a remote unit 102 may have a same understanding of the NDI. In various embodiments, upon reception of an UL grant, a first step for a remote unit 102 may be to detect an NDI to determine whether an UL grant is for initial transmission or retransmission. In one embodiment, for an UL grant scheduling an initial transmission, no new field may be introduced. In certain embodiments, in situations in which one UL TB is correctly decoded at a base unit 104, the base unit 104 may continue to assign radio resource for the transmission of a next TB; otherwise, a base unit 104 may send an UL grant for scheduling retransmission. In some embodiments, a one-bit NDI may be used as an ACK or NACK bit for TB-level HARQ-ACK indication.

In various embodiments, for an UL grant scheduling retransmission, the UL grant may imply that a TB is not fully successfully decoded at a base unit 104. In some embodiments, a modulation and coding scheme ("MCS") field for retransmission may be kept unchanged. In certain embodiments, an MCS field may be reused as a bitmap for CBG-based HARQ-ACK feedback indication. In certain embodiments, a bit length of an MCS field may be used to determine a number of CBGs for UL data transmission. In another embodiment, to increase a bitmap length for finer CBG granularity, a field of transmit power control ("TPC") command indication may be combined with an MCS field. Accordingly, retransmission may use a same power as an initial transmission.

In some embodiments, if a CBG-based retransmission may be scheduled in a mini-slot, a frequency resource may be kept unchanged. Accordingly, a field for frequency resource allocation indication may be used for CBG-based HARQ-ACK feedback indication. In various embodiments, an MCS field can be split into two parts, one part for indicating modulation and another part for indicating one or more CBGs to be retransmitted (e.g., for a 5-bit MCS field, the first two bits may be used for indicating modulation and the other three bits may be used for indicating one or more CBGs to be retransmitted). In certain embodiments, regardless of which field or fields are used as CBG-based ACK/NACK indication in an UL grant for retransmission, a length of a bit field for HARQ-ACK feedback may be used to determine a number of CBGs.

In various embodiments, for an UL grant scheduling retransmission of a TB, an ACK/NACK field may be a bitmap with each bit indicating a decoding status corresponding to one CBG. In some embodiments, a predefined rule may be used to link an order of bits with an order of CBGs. In certain embodiments, a MSB of an ACK/NACK field indicates a HARQ-ACK corresponding to a first CBG. In one embodiment, a LSB of an ACK/NACK field indicates a HARQ-ACK corresponding to a first CBG. In various embodiments, a LSB of an ACK/NACK field indicates a HARQ-ACK corresponding to a last CBG.

There may be any number of embodiments for CBG-based HARQ-ACK indication. In one embodiment, a number of CBGs may be equal to a bit length of a field for CBG-based HARQ-ACK indication and a CBG size may be changed during each retransmission according to the number of remaining CBs. In certain embodiments, in an UL grant for a first retransmission, each bit of an ACK/NACK field may correspond to one CBG. In some embodiments, in an UL grant for a second retransmission, each bit of an ACK/NACK field may correspond to one CBG while the CBG is different to that in a first retransmission. In one embodiment, assume that a 5-bit field is used as a HARQ-ACK indication and an UL TB consists of 25 CBs. In such an embodiment, the TB may be partitioned to 5 CBGs with each CBG includes 5 CBs. In an UL grant scheduling a first retransmission, each HARQ-ACK bit corresponds to one CBG. Assuming only the third and the fourth CBGs are not correctly decoded, the base unit 104 indicates 5-bit HARQ-ACK for 5 CBGs as ACK, ACK, NACK, NACK, ACK. So only two CBGs need retransmission. The two CBGs include 10 CBs and the 10 CBs are partitioned to 5 CBGs with each CBG including two CBs. Thus, in an UL grant scheduling a second retransmission, 5 HARQ-ACK bits may be used to indicate 10 CBs. With finer granularity, the retransmission efficiency can be improved.

In another embodiment, a number of CBGs may be equal to a bit length of a field for CBG-based HARQ-ACK indication and a CBG size may be unchanged for each retransmission regardless of the number of remaining CBs. In certain embodiments, in an UL grant for a first retransmission and an UL grant for subsequent retransmissions, each bit of the ACK/NACK field may repeatedly correspond to one specific CBG. Therefore, in such embodiments, some ACK/NACK bits corresponding to successfully decoded CBGs may be redundant. In one embodiment, assume that a 5-bit field is used as a HARQ-ACK indication for 5 CBGs and only the third and fourth CBGs are indicated as "NACK" as ACK, ACK, NACK, NACK, ACK. Accordingly, a remote unit 102 may retransmit the third and fourth CBGs in a first retransmission. In an UL grant for a second retransmission, assume that the third CBG is correctly decoded while the fourth not, then the base unit 104 may indicate ACK, ACK, ACK, NACK, ACK, and the base unit 102 may retransmit the fourth CBG. Therefore, the HARQ-ACK bits for already correctly decoded CBGs may be indicated several times (e.g., first, second, and fifth CBGs).

In one embodiment, a new field may be introduced for a base unit 104 to indicate failed CBGs to be retransmitted. In such an embodiment, the field may be contained in an UL grant for scheduling the retransmission of indicated CBGs. In some embodiments, a same HARQ process identification ("ID") may be maintained between initial transmission and retransmission. In various embodiments, a one-bit NDI may be used to differentiate an initial transmission or retransmission of an UL TB. In certain embodiments, both a base unit 104 and a remote unit 102 may maintain a same understanding of an NDI. In one embodiment, upon reception of an UL grant, a first step for a remote unit 102 may be used to detect an NDI to determine whether an UL grant is for initial transmission or retransmission. Accordingly, a one-bit NDI may be used as an ACK or NACK bit for TB-level HARQ-ACK indication.

In certain embodiments, for CBGs which have been successfully decoded at a base unit 102 may not be indicated with "ACK" to a remote unit 102. In some embodiments, only the CBGs to be scheduled for retransmission may be indicated in a new filed in an UL grant. In various embodiments, for an UL grant scheduling initial transmission, a new field may be reserved and neglected by a remote unit 102 or set to a predefined state for virtual CRC. In one embodiment, a base unit 104 may clearly know which CBGs are failed after decoding. In various embodiments, regarding indicating the CBGs to be retransmitted, there may be a variety of alternatives.

In one embodiment, an index of failed CBGs may be included in a new field. In some embodiments, only one failed CBG may be indicated for retransmission. Accordingly, a number of needed bits for indicating a specific CBG is related to a number of CBGs. Therefore, if a bit length of a new field is 3, then the three bits are enough to index a specific CBG within up to 8 CBGs.

In another embodiment, more than one failed CBGs may be included in a new field. Accordingly, a number of needed bits may be related to a number of CBGs and a number of CBGs to be retransmitted. For example, if a maximum number of CBGs for an UL TB is 8 and the bit length of the new field is 6, then the six bits may indicate up to two CBGs for retransmission. In a further embodiment, a predefined pattern for indicating failed CBGs may be included in a new field. For example, three bits may be used to indicate one of eight predefined patterns found in Table 1 and Table 2.

TABLE 1

| Bits | Indicated CBGs For Retransmission |
| --- | --- |
| 000 | CBG 1 |
| 001 | CBG 2 |
| 010 | CBG 3 |
| 011 | CBG 4 |
| 100 | CBG 1 and 2 |
| 101 | CBG 2 and 3 |
| 110 | CBG 3 and 4 |
| 111 | CBG 1 and 4 |

TABLE 2

| Bits | Indicated CBGs For Retransmission |
|---|---|
| 000 | CBG 1 |
| 001 | CBG 2 |
| 010 | CBG 3 |
| 011 | CBG 4 |
| 100 | CBG 1 and 2 |
| 101 | CBG 2 and 3 |
| 110 | CBG 3 and 4 |
| 111 | CBG 1, 2, 3 and 4 |

In some embodiments, upon a remote unit 102 receiving an UL grant, the remote unit 102 may first detect whether this is for initial transmission or retransmission via NDI. In response to the UL grant being for initial transmission, the remote unit 102 may neglect a field if the field is reserved in UL grant for initial transmission and/or checks it when it is predefined for virtual CRC in UL grant for initial transmission. In response to the UL grant being for retransmission, the remote unit 102 may detect the field to get information of the CBGs that the base unit 104 schedules for retransmission and retransmits it/them on the scheduled resource.

In certain embodiments, the remote unit 102 may not assume that code block groups which are not indicated for retransmission in a given uplink grant are ACKed (e.g., or received correctly) by a base unit 104. That is, the base unit 104 may request retransmission of such code block groups in future retransmission grants. For example, there may be two code block groups with errors and only one at a time may be retransmitted.

Figure 4:
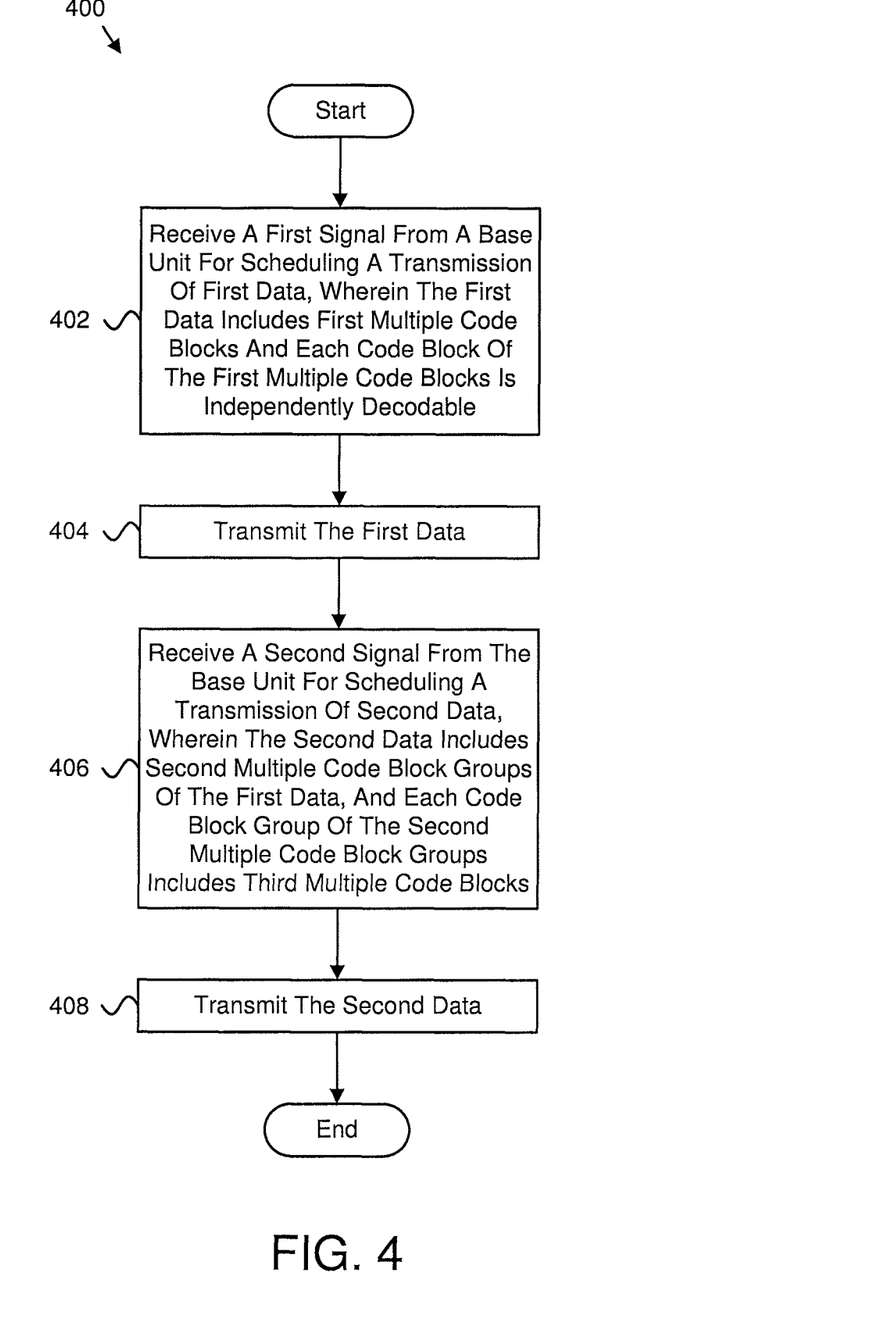
FIG. 4 is a schematic flow chart diagram illustrating one embodiment of a method for receiving a signal for scheduling transmission of data.

FIG. 4 is a schematic flow chart diagram illustrating one embodiment of a method 400 for receiving a signal for scheduling transmission of data. In some embodiments, the method 400 is performed by an apparatus, such as the remote unit 102. In certain embodiments, the method 400 may be performed by a processor executing program code, for example, a microcontroller, a microprocessor, a CPU, a GPU, an auxiliary processing unit, a FPGA, or the like.

The method 400 may include receiving 402 a first signal from a base unit for scheduling a transmission of first data. In various embodiments, the first data includes first multiple code blocks and each code block of the first multiple code blocks is independently decodable. In certain embodiments, the method 400 includes transmitting 404 the first data. In various embodiments, the method 400 includes receiving 406 a second signal from the base unit for scheduling a transmission of second data. In some embodiments, the second data includes second multiple code block groups of the first data, and each code block group of the second multiple code block groups include third multiple code blocks. In some embodiments, the method 400 includes transmitting 408 the second data.

In one embodiment, the first signal is used for scheduling an initial transmission and the second signal is used for scheduling a retransmission. In a further embodiment, the first signal and the second signal have a same payload size. In certain embodiments, the second signal further includes a bitmap and each bit in the bitmap indicates a decoding result corresponding to a code block group of the first data. In various embodiments, the decoding result corresponding to a code block group is an ACKNOWLEDGEMENT in response to all the code blocks of the code block group being correctly decoded and a NEGATIVE ACKNOWLEDGEMENT in response to not all the code blocks of the code block group being correctly decoded. In some embodiments, a length of the bitmap is configured by the base unit. In one embodiment, a length of the bitmap is predefined.

In certain embodiments, a length of the bitmap is equal to a configured maximum number of code block groups. In some embodiments, the bitmap is determined by reinterpreting a field in the second signal for indicating modulation and coding scheme, transmit power adjustment, frequency resource allocation, or some combination thereof. In various embodiments, the bitmap in the first signal is reinterpreted as a number of code block groups the first data is partitioned into.

In one embodiment, the second signal further includes a field for indicating a code block group of the first data in response to the code block group not being correctly decoded and to be transmitted in the second data. In certain embodiments, the field includes an index to the code block group to be transmitted. In some embodiments, the field includes an index to one of multiple predefined patterns for indicating one or more code block groups to be transmitted. In various embodiments, the field in the first signal is reinterpreted as a number of code block groups the first data is partitioned into.

In some embodiments, a field for indicating modulation and coding scheme in the second signal is split into two parts with one part for indicating modulation and another part for indicating a code block group to be retransmitted. In certain embodiments, the second signal includes a field that indicates feedback information corresponding to the first data, a number of code block groups is equal to a bit length of the field, and a code block group size is changed based on a number of code blocks remaining to be retransmitted in the second data. In various embodiments, the second signal includes a field that indicates feedback information corresponding to the first data, a number of code block groups is equal to a bit length of the field, and a code block group size is unchanged regardless of a number of code blocks remaining to be retransmitted in the second data.

Figure 5:
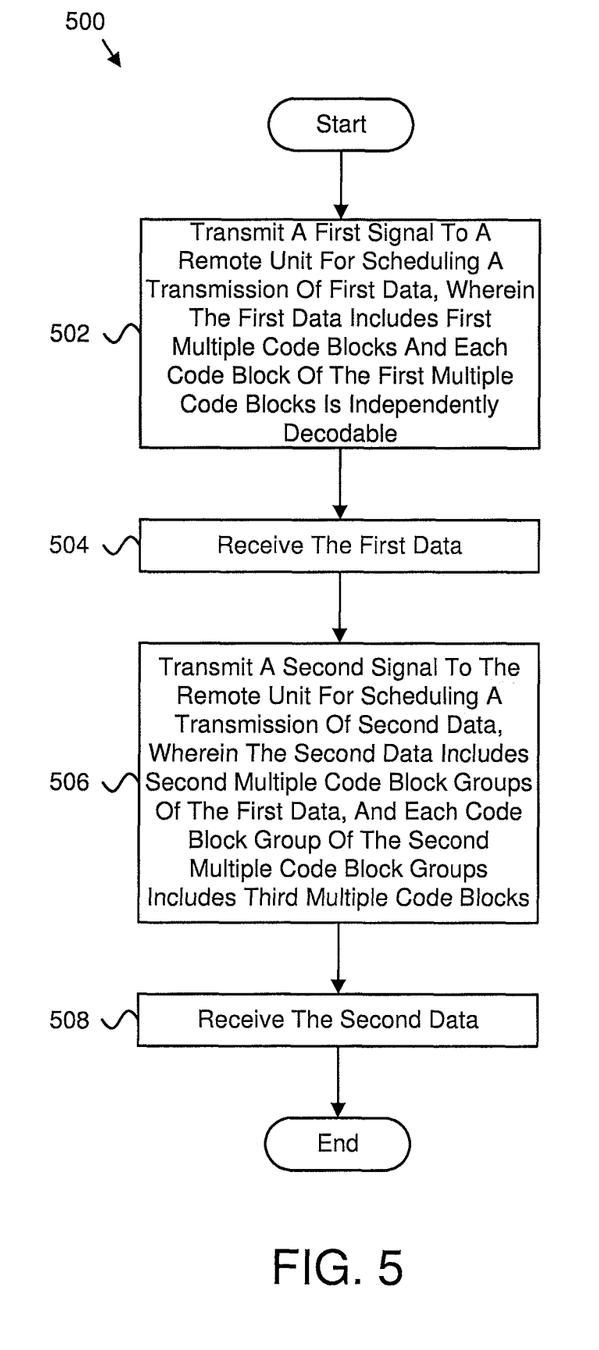
FIG. 5 is a schematic flow chart diagram illustrating one embodiment of a method for transmitting a signal for scheduling transmission of data.

FIG. 5 is a schematic flow chart diagram illustrating one embodiment of a method 500 for transmitting a signal for scheduling transmission of data. In some embodiments, the method 500 is performed by an apparatus, such as the base unit 104. In certain embodiments, the method 500 may be performed by a processor executing program code, for example, a microcontroller, a microprocessor, a CPU, a GPU, an auxiliary processing unit, a FPGA, or the like.

The method 500 may include transmitting 502 a first signal to a remote unit for scheduling a transmission of first data. In various embodiments, the first data includes first multiple code blocks and each code block of the first multiple code blocks is independently decodable. In certain embodiments, the method 500 includes receiving 504 the first data. In various embodiments, the method 500 includes transmitting 506 a second signal to the remote unit for scheduling a transmission of second data. In some embodiments, the second data includes second multiple code block groups of the first data, and each code block group of the second multiple code block groups include third multiple code blocks. In some embodiments, the method 500 includes receiving 508 the second data.

In one embodiment, the first signal is used for scheduling an initial transmission and the second signal is used for scheduling a retransmission. In a further embodiment, the first signal and the second signal have a same payload size. In certain embodiments, the second signal further includes a bitmap and each bit in the bitmap indicates a decoding result corresponding to a code block group of the first data. In various embodiments, the decoding result corresponding to a code block group is an ACKNOWLEDGEMENT in response to all the code blocks of the code block group being correctly decoded and a NEGATIVE ACKNOWLEDGEMENT in response to not all the code blocks of the code block group being correctly decoded. In some embodiments, a length of the bitmap is configured by the base unit. In one embodiment, a length of the bitmap is predefined.

In certain embodiments, a length of the bitmap is equal to a configured maximum number of code block groups. In some embodiments, the bitmap is determined by reinterpreting a field in the second signal for indicating modulation and coding scheme, transmit power adjustment, frequency resource allocation, or some combination thereof. In various embodiments, the bitmap in the first signal is reinterpreted as a number of code block groups the first data is partitioned into.

In one embodiment, the second signal further includes a field for indicating a code block group of the first data in response to the code block group not being correctly decoded and to be transmitted in the second data. In certain embodiments, the field includes an index to the code block group to be transmitted. In some embodiments, the field includes an index to one of multiple predefined patterns for indicating one or more code block groups to be transmitted. In various embodiments, the field in the first signal is reinterpreted as a number of code block groups the first data is partitioned into.

In some embodiments, a field for indicating modulation and coding scheme in the second signal is split into two parts with one part for indicating modulation and another part for indicating a code block group to be retransmitted. In certain embodiments, the second signal includes a field that indicates feedback information corresponding to the first data, a number of code block groups is equal to a bit length of the field, and a code block group size is changed based on a number of code blocks remaining to be retransmitted in the second data. In various embodiments, the second signal includes a field that indicates feedback information corresponding to the first data, a number of code block groups is equal to a bit length of the field, and a code block group size is unchanged regardless of a number of code blocks remaining to be retransmitted in the second data.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
a receiver that receives a first signal from a base unit comprising a first uplink grant for scheduling a transmission of first data, wherein the first data comprises a first plurality of code blocks and each code block of the first plurality of code blocks is independently decodable; and
a transmitter that transmits the first data;
wherein the receiver receives a second signal from the base unit comprising a second uplink grant for scheduling a transmission of second data, the second uplink grant is based on portions of the first data received by the base unit, the second uplink grant is the same size as the first uplink grant, a second hybrid automatic repeat request field in the second uplink grant is the same size as a first hybrid automatic repeat request field in the first uplink grant, the second data comprises a second plurality of code block groups of the first data, each code block group of the second plurality of code block groups comprises a second plurality of code blocks, and the transmitter transmits the second data.

2. The apparatus of claim 1, wherein the first signal is used for scheduling an initial transmission and the second signal is used for scheduling a retransmission.

3. The apparatus of claim 1, wherein the first signal and the second signal have a same payload size.

4. The apparatus of claim 1, wherein the second signal further comprises a bitmap and each bit in the bitmap indicates a decoding result corresponding to a code block group of the first data.

5. The apparatus of claim 4, wherein the decoding result corresponding to a code block group is an ACKNOWLEDGEMENT in response to all the code blocks of the code block group being correctly decoded and a NEGATIVE ACKNOWLEDGEMENT in response to not all the code blocks of the code block group being correctly decoded.

6. The apparatus of claim 4, wherein a length of the bitmap is configured by the base unit.

7. The apparatus of claim 4, wherein a length of the bitmap is predefined.

8. The apparatus of claim 4, wherein a length of the bitmap is equal to a configured maximum number of code block groups.

9. The apparatus of claim 4, wherein the bitmap is determined by reinterpreting a field in the second signal for indicating modulation and coding scheme, transmit power adjustment, frequency resource allocation, or some combination thereof.

10. The apparatus of claim 4, wherein the bitmap in the first signal is reinterpreted as a number of code block groups the first data is partitioned into.

11. The apparatus of claim 1, wherein the second signal further comprises a field for indicating a code block group of the first data in response to the code block group not being correctly decoded and to be transmitted in the second data.

12. The apparatus of claim 11, wherein the field comprises an index to the code block group to be transmitted.

13. The apparatus of claim 11, wherein the field comprises an index to one of a plurality of predefined patterns for indicating one or more code block groups to be transmitted.

14. The apparatus of claim 11, wherein the field in the first signal is reinterpreted as a number of code block groups the first data is partitioned into.

15. The apparatus of claim 1, wherein a field for indicating modulation and coding scheme in the second signal is split into two parts with one part for indicating modulation and another part for indicating a code block group to be retransmitted.

16. The apparatus of claim 1, wherein the second signal comprises a field that indicates feedback information corresponding to the first data, a number of code block groups is equal to a bit length of the field, and a code block group size is changed based on a number of code blocks remaining to be retransmitted in the second data.

17. The apparatus of claim 1, wherein the second signal comprises a field that indicates feedback information corresponding to the first data, a number of code block groups is equal to a bit length of the field, and a code block group size is unchanged regardless of a number of code blocks remaining to be retransmitted in the second data.

18. An apparatus comprising:
a transmitter that transmits a first signal to a remote unit comprising a first uplink grant for scheduling a transmission of first data, wherein the first data comprises a first plurality of code blocks and each code block of the first plurality of code blocks is independently decodable; and a receiver that receives the first data;

wherein the transmitter transmits a second signal to the remote unit comprising a second uplink grant for scheduling a transmission of second data, the second uplink grant is based on portions of the first data received, the second uplink grant is the same size as the first uplink grant, a second hybrid automatic repeat request field in the second uplink grant is the same size as a first hybrid automatic repeat request field in the first uplink grant, the second data comprises a second plurality of code block groups of the first data, each code block group of the second plurality of code block groups comprises a second plurality of code blocks, and the receiver receives the second data.

19. The apparatus of claim 18, wherein the second signal further comprises a bitmap and each bit in the bitmap indicates a decoding result corresponding to a code block group of the first data.

20. The apparatus of claim 19, wherein the bitmap is determined by reinterpreting a field in the second signal for indicating modulation and coding scheme, transmit power adjustment, frequency resource allocation, or some combination thereof.

* * * * *